United States Patent [19]

Fredrickson

[11] Patent Number: 4,878,521

[45] Date of Patent: Nov. 7, 1989

[54] APPARATUS FOR PARTING AND PASTING BATTERY PLATE GRIDS

[75] Inventor: Roy A. Fredrickson, Stevensville, Mich.

[73] Assignee: Mac Engineering & Equipment Company, Inc., Benton Harbor, Mich.

[21] Appl. No.: 264,055

[22] Filed: Oct. 28, 1988

[51] Int. Cl.$^4$ .............................................. H01M 7/00
[52] U.S. Cl. ...................................... 141/1.1; 141/32; 141/129; 29/2; 29/623.1; 29/623.5; 429/48
[58] Field of Search ..................... 141/1.1, 32, 33, 129; 118/38, 58; 429/48; 29/2, 623.1, 623.5

[56] References Cited

U.S. PATENT DOCUMENTS

| | | | |
|---|---|---|---|
| 3,621,543 | 11/1971 | Willmann et al. | 29/2 |
| 4,016,633 | 4/1977 | Smith et al. | 29/2 |
| 4,050,482 | 9/1977 | Ching et al. | 141/1.1 |
| 4,196,757 | 4/1980 | Hug et al. | 141/1.1 |
| 4,342,342 | 8/1982 | Wheadon | 141/1.1 |
| 4,435,885 | 3/1984 | Suzuki et al. | 29/2 |
| 4,469,145 | 9/1984 | Fletcher et al. | 141/1.1 |

*Primary Examiner*—Ernest G. Cusick
*Attorney, Agent, or Firm*—Michael, Best & Friedrich

[57] ABSTRACT

An apparatus for dividing a multi-unit battery plate grid into individual battery plate grids and for subsequently applying paste to the individual battery plate grids, which apparatus comprises a pasting device for applying paste to the grids, a parter located upstream of the pasting device for dividing multi-unit battery plate grids into individual battery plate grids prior to pasting thereof, and a conveyor for feeding multi-unit battery plate grids through the parter and for thereafter feeding the individual battery plate grids through the pasting device. Also disclosed herein is a method of dividing a multi unit battery plate grid including at least two connected individual battery plate grids into separated individual battery plate grids and of subsequently pasting the separated individual battery plate grids, which method comprises the steps of dividing the multi-unit battery plate grid into separated individual battery plate grids, and thereafter pasting the individual separated battery plate grids.

19 Claims, 1 Drawing Sheet

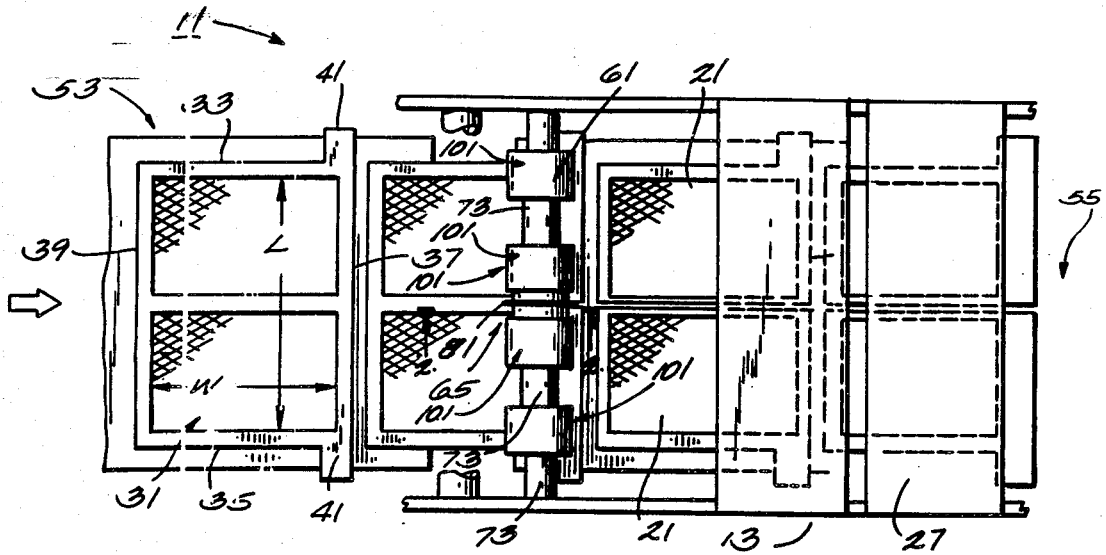

APPARATUS FOR PARTING AND PASTING BATTERY PLATE GRIDS

BACKGROUND OF THE INVENTION

The invention relates generally to apparatus for making batteries. More particularly, the invention relates to arrangements for pasting and drying battery plate grids and sub-dividing the battery plate grids.

In the past, multi-unit battery plate grids have been conveyed through a paster and drying oven wherein the grids were pasted and then dried. Thereafter, the pasted and dried multi-unit battery plate grids were parted, i.e., subdivided into two individual battery plate grids which were subsequently incorporated into a battery.

Parting of multi-unit battery plate grids after pasting and drying has several disadvantages. In the first place, it is difficult to properly orient and convey such pasted grids from a drying oven to a parting means. Such orientation and conveyance is very important to accurate parting. Secondly, parting of pasted grids generates considerable dust and exposes operators involved in the parting operation to potential lead contamination and the possibility of lead poisoning.

Attention is directed to U.S. Pat. No. 4,665,861.

SUMMARY OF THE INVENTION

This invention provides apparatus for dividing a multi-unit battery plate grid into two individual battery plate grids and for subsequently pasting the battery plate grids, which apparatus comprises means for dividing a multi-unit battery plate grid into individual battery plate grids, and means for thereafter pasting the individual battery plate grids.

The invention also provides apparatus for dividing a multi-unit battery plate grid into two individual battery plate grids and for subsequently applying paste to the individual battery plate grids and drying the individual pasted battery plate grids, which apparatus comprises a pasting device for applying paste to the grids, a drying oven located downstream of the parting device, parting means located upstream of the pasting device for dividing multi-unit battery plate grids into individual battery plate grids prior to pasting thereof, and conveyor means for feeding multi-unit battery plate grids through the parting means and for thereafter feeding the individual battery plate grids through the pasting device and the drying oven.

The invention also provides a method of dividing a multi-unit battery plate grid into individual battery plate grids and of subsequently pasting the battery plate grids, which method comprises the steps of dividing a multi-unit battery plate grid into individual battery plate grids, and thereafter pasting the individual battery plate grids.

Other features and advantages of the invention will become apparent to those skilled in the art upon review of the following detailed description, claims, and drawings.

DESCRIPTION OF THE DRAWINGS

FIG. 1 is a partially schematic and partially broken away plan view of apparatus embodying various of the features of the invention.

FIG. 2 is a fragmentary side view of the apparatus shown in FIG. 1 and with a portion thereof taken along line 2—2 of FIG. 1.

FIG. 3 is a fragmentary enlarged view of a portion of the apparatus shown in FIGS. 1 and 2.

FIG. 4 is a view taken generally along line 4—4 of FIG. 3.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in the drawings is apparatus 11 comprising, in part, a pasting device or machine 13 (schematically illustrated) wherein paste is supplied to individual battery plate grids 21. The individual pasted grids 21, with the paste thereon, are commonly subsequently dried or baked in a drying oven 27 (schematically illustrated). Any suitable construction can be employed for the pasting machine 13 and for the drying oven 27. The individual battery plate grids 21 to which the paste is applied and which can thereafter be dried or baked, if necessary or desirable, can be of cast or other suitable construction. The individual battery plate grids 21 to which the paste is applied are initially portions of a multi-unit battery plate grid 31 which is generally rectangular in shape, having a length "L" defined between two side edges 33 and 35 and a width "W" defined between a top edge 37 and a bottom edge 39. Respectively extending from each of the side edges 33 and 35 in adjacent relation to the top edge 37 are lugs 41.

The pasting device or machine 13 also includes conveying means 51 for transporting such multi-unit battery plate grids 31 from a supply station 53 through the pasting machine 13, possibly through a drying oven 27, and to a delivery station 55. While various conveyor constructions can be employed, in the disclosed construction, the conveying means 51 includes a supply conveyor 57 for feeding the multi-battery plate grids 31 to the parting means still to be described, and a paster conveyor 59 which receives the individual grids 21 from the supply conveyor 57 and transports such individual grids 21 through the pasting machine 13, and possibly through a drying oven 27 to the delivery station 55. Any suitable construction can be employed for the conveying means 51. The conveyors 57 and 59 are powered by any suitable prime mover, such as an electric motor 60 (shown schematically), and by a suitable drive means 54 (shown schematically).

The apparatus 11 involves the location, upstream of the pasting machine 13, and downstream of the supply station, and between the supply and paster conveyor 57 and 59, respectively, of a parting device, mechanism, or means 61 for dividing such multi-unit battery plate grids 31 into individual or single unit battery plate grids 21. While multi-unit battery plate grids are usually divided into two individual battery plates, this invention is not limited to making just one cut, but can be made to make multiple cuts—thus dividing the multi-unit battery plates into several individual grids. In the specifically disclosed construction, the multi-unit battery plate grid 31 is cut into two individual pieces or grids 21 midway between the side edges 33 and 35 and in the direction of the width "W" to provide two generally identical pieces or grids 21.

Any suitable construction can be employed to provide the parting device or means 61. In the disclosed construction, the parting device or means 61 is incorporated as a part of the pasting machine 13. However, a free-standing parting machine located in adjacent relation to a pasting machine is also contemplated by the disclosed construction. The parting machine or device or means 61 includes a lower anvil roller 63 and an upper cutting roller or disc 65, which rollers 63 and 65 are located in adjacent relation to each other for receipt therebetween of multi-unit battery plate grids 31 from the supply conveyor 57 and for severance of the multi-unit battery plate grids 31 into individual battery grids or pieces 21 in response to multi-unit grid passage therebetween and for delivery to the paster conveyor 59. One or both of the anvil and cutting rollers 63 and 65 can be power driven by the prime mover 60 which also drives the conveyor means 51. In the specifically disclosed construction, only the anvil roller 63 is powered. In addition, if desired, the rollers 63 and 65 can be powered independently of the conveyor means 51.

The upper cutting roller of disc 65 is preferably fabricated of steel, is fixedly carried on a rotatable upper transverse shaft 73 and, preferably, is of circular disc shape and includes two side faces 75 and 77 which form a cutting portion 79 having a knife or cutting edge 81 located in a cutting plane 83 positioned to cut the multi-unit grids 31, usually through the center of a double grid. Still more specifically, the two side faces diverge from the cutting edge 81 at an angle which can be about fifteen degrees on either side of the cutting plane 83. As a consequence, the cutting edge 81 is formed by an included angle of about thirty degrees.

The lower or anvil roller 63 preferably is fabricated of steel and includes a center portion having a groove 91 designed to at least partially receive the cutting portion 79 of the cutting disc 65. Laterally outwardly of the groove, the anvil roller was an outer surface 92 which is preferably axially grooved.

The lower or anvil roller 63 acts as an anvil to support the multi-unit grids 31 during cutting. In addition, the lower or anvil roller 63 can, in part, be urethane covered. The anvil or lower roller 63 may also contain a cutting disc in alignment with the upper cutting disc 65.

More specifically, in the disclosed construction, the groove 91 is formed by a pair of side faces 93 and 95 which define a bottom 97 and an include angle which is less than the included angle of the cutting disc 65. While other constructions can be employed, in the disclosed construction, the included angle of the groove 91 is about twenty-five degrees, i.e., about $12\frac{1}{2}°$ on each side of the cutting plane 83. As a result, the side faces 75 and 77 of the cutting disc 65 engage the side faces 93 and 95 of the groove 91 in the area adjacent the juncture of the groove 91 and the outer surface 92 of the anvil roller 63. As a consequence, the cutting edge 81 is substantially prevented from wandering from the cutting plane 83 due to the support afforded to the pointed cutting portion 79 of the cutting disc 65 by the groove 91, and the cutting edge 81 is spaced from the bottom 97 of the groove.

Such stabilization not only prevents the cutting disc 65 from wandering, but, as will be pointed out hereinafter, also advantageously serves to diminish random grid movement from planned locations for passage from the parting means 61 to the parting device 13.

In this last regard, the disclosed parting mechanism or device or means 61 also includes means for stabilizing the battery grids during the cutting or severing operation and as the separated grids 21 are supplied to the paster conveyor 59. While other arrangements can be employed, in the disclosed construction, such means includes the stabilization of the cutting portion 79 of the cutting disc 65, as referred to immediately above, as well as provision for yieldably holding the multi-unit grids 31 during the cutting process and for delivering the individual grids 21 from the supply conveyor 57 to the paster conveyor 59 in locations facilitating subsequent pasting operation by the pasting device 13.

While other arrangements can be employed, in the disclosed construction, the upper shaft 73 which carries the cutting disc 65 also carries, on each side of the cutting disc 65, a resilient guide roller 101 which is dimensioned to have an interference fit with the underlying multi-unit grid 31 or individual grids 21 as the grids pass between the anvil roller 63 and the guide rollers 101. As a consequence, the resilient guide rollers 101 deform to provide more than a tangential line-of-contact with the underlying grids during passage thereunder and to yieldably and releasably hold the underlying multi-unit grid 31 during the cutting process and during delivery of the individual grids 21 to the paster conveyor 59. The guide rollers 101 can be suitably fixed on the transverse shaft 73 and are fabricated from a compressible material, such as urethane or rubber, to provide, as indicated, pressure on the grids both for purposes of conveying or transporting the grids and to retain the grids in proper orientation for accurate cutting. Preferably, the guide rollers 101 are of durometer #30 material. Alternatively, the guide rollers 101 can be formed by a coating on the transverse shaft 73.

Still more specifically, in the disclosed construction, four separate and axially spaced resilient guide rollers 101 are employed, are individually adjustable along the axis of the transverse shaft 73, and are held in place by an interference fit with the shaft. The resilient guide rollers 101 are approximately one-third as wide as their diameter. As a consequence, the area of engagement between the resilient guide rollers 101 and the underlying grids 21 or 31 can expand both in the direction of grid travel and in the direction transverse to the direction of grid travel. However, the resilience of the material of the guide rollers 101 and the amount of interference between the guide rollers 101 and the grids 21 or 31 is insufficient to "bend" the grids 21 or 31 around the anvil roller 63, but is, at the same time, adequate to afford grid stabilization during passage between the guide rollers 101 and the anvil roller 63 of grids having differing thicknesses. The guide rollers 101 also act as the drive link between the anvil roller 63 and the transverse shaft 73 which thus propels the cutting disc 65 which is attached to the transverse shaft 73.

For battery grids which may not require parting, adjustment or removal of the cutting or upper roller 65 permits the parting device mechanism 61 to act simply as a transfer device between the supply conveyor 57 and the paster conveyor 59.

In operation, multi-unit battery plate grids 31 are individually fed by the supply conveyor 57 from the supply station 53 and through the parting device or means 61 to divide the multi-unit grids 31 into two individual or separate battery plate grids or pieces 21.

The paster conveyor 59 then transports the two individual or separate grids or pieces 21 in adjacent side by side relation to each other through the pasting device 15 wherein paste is supplied to the individual grids 21. The paster conveyor 59 can then, if desired, deliver the pasted grids 21 to the drying and baking oven 27, and subsequently to the delivery station 55.

Such parting of the multi-unit battery plate grids 31 prior to pasting (and drying) has many advantages including avoidance of the difficulty of properly orienting and controlling pasted grids for proper presentation to a parting device. Such orientation and control is very important to accurate parting and efficient production. Further, the parting of unpasted grids is a much cleaner operation than the parting of pasted grids. Thus, the disclosed apparatus can be simpler and more reliable. Still further, the parting of grids by the pasting machine prior to pasting eliminates the separate parting operation commonly used heretofore by battery manufacturers. This separate parting operation was sometimes accomplished mechanically and sometimes manually. In any event, such separate parting operation requires additional manpower not required when utilizing the invention.

Existing mechanisms can be modified in accordance with the invention to locate a parting mechanism or device upstream of a pasting device.

Various of the features of the invention are set forth in the following claims.

I claim:

1. Apparatus for dividing a multi-unit battery plate grid including at least two connected battery plate grids into separated individual battery plate grids and for subsequently pasting the separated individual battery plate grids, said apparatus comprising means for dividing a multi-unit battery plate grid into separated individual battery plate grids, and means for thereafter pasting the separated individual battery plate grids.

2. Apparatus for dividing a multi-unit battery plate grid into individual battery plate grids and for subsequently pasting the battery plate grids, said apparatus comprising means for dividing a multi-unit battery plate grid into individual battery plate grids, said dividing means including an anvil roller with an outer surface having therein an annular groove, and a cutting disc having a cutting portion extending into said annular groove, and means for thereafter pasting the individual battery plate grids.

3. Apparatus in accordance with claim 2 wherein said annular groove is of V-shape and has an included angle, and wherein said cutting portion is pointed and is defined by an included angle greater than said included angle of said annular groove.

4. Apparatus in accordance with claim 3 wherein said included angle of said annular groove is about 25° and wherein said included angle of said cutting portion is about 30°.

5. Apparatus in accordance with claim 2 wherein said annular groove has side faces, and wherein said cutting portion has side faces engaging said side faces of said annular groove in the area adjacent the junction of said side faces of said annular groove with said outer surface.

6. Apparatus in accordance with claim 2 wherein said annular groove has a bottom and wherein said cutting portion includes a cutting edge radially spaced from said bottom of said annular groove.

7. Apparatus for dividing a multi-unit battery plate grid into individual battery plate grids and for subsequently pasting the battery plate grids, said apparatus comprising means for dividing a multi-unit battery plate grid into individual battery plate grids, said dividing means including an anvil roller, a cutting disc cooperating with said anvil roller to sever the multi-unit battery plate grids into individual grids, and, on each side of said cutting disc, a guide roller supported in parallel relation to said anvil roller, fabricated of resilient material, and adapted to resiliently deform in response to grid passage between said guide rollers and said anvil roller and to yieldably grip and stabilize said individual grids against unwanted movement during severance of the multi-unit battery plate grid into the individual grids and during delivery of the individual grids from said dividing means, and means for thereafter pasting the individual battery plate grids.

8. Apparatus in accordance with claim 7 wherein said guide rollers each include a central annular recess and axially spaced radially outwardly projecting portions having grid engaging outer surfaces.

9. Apparatus in accordance with claim 8 wherein said guide rollers are fabricated of urethane or rubber and have a durometer #30.

10. Apparatus for dividing a multi-unit battery plate grid including at least two connected individual battery plate grids into separated individual battery plate grids and for subsequently applying paste to the separated individual battery plate grids and drying the separated individual pasted battery plate grids, said apparatus comprising a pasting device for applying paste to the grids, a drying oven located downstream of said pasting device, parting means located upstream of said pasting device for dividing multi-unit battery place grids into separated individual battery plate grids prior to pasting thereof, and conveyor means for feeding multi-unit battery plate grids through said parting means and for thereafter feeding the separated individual battery plate grids through said pasting device and said drying oven.

11. Apparatus for dividing a multi-unit battery plate grid into individual battery plate grids and for subsequently applying paste to the individual battery plate grids and drying the individual pasted battery plate grids, said apparatus comprising a pasting device for applying paste to the grids, a drying oven located downstream of said pasting device, parting means located upstream of said pasting device for dividing multi-unit battery place grids into individual battery plate grids prior to pasting thereof, said dividing means including an anvil roller with an outer surface having therein an annular groove, and a cutting disc having a cutting portion extending into said annular groove, and conveyor means for feeding multi-unit battery plate grids through said parting means and for thereafter feeding the individual battery plate grids through said pasting device and said drying oven.

12. Apparatus in accordance with claim 11 wherein said annular groove is of V-shape and has an included angle, and wherein said cutting portion is pointed and is defined by an included angle greater than said included angle of said annular groove.

13. Apparatus in accordance with claim 12 wherein said included angle of said annular groove is about 25° and wherein said included angle of said cutting portion is about 30°.

14. Apparatus in accordance with claim 11 wherein said annular groove has side faces, and wherein said cutting portion has side faces engaging said side faces of said annular groove in the area adjacent the junction of said side faces of said annular groove with said outer surface.

15. Apparatus in accordance with claim 11 wherein said annular groove has a bottom and wherein said cutting portion includes a cutting edge radially spaced from said bottom of said annular groove.

16. Apparatus in accordance with claim 11 wherein said dividing means includes an anvil roller, a cutting disc cooperating with said anvil roller to sever the multi-unit battery plate grids into individual grids, and, on each side of said cutting roller, a guide disc supported in parallel relation to said anvil roller, fabricated of resilient material, and adapted to resiliently deform in response to grid passage between said guide rollers and said anvil roller and to yieldably grip and stabilize said individual grids against unwanted movement during severance of the multi-unit battery plate grid into the individual grids and during delivery of the individual grids to said pasting means.

17. Apparatus in accordance with claim 16 wherein said guide roller and said cutting disc are mounted on a cutting disc shaft, wherein said guide roller is individually adjustable along the axis of said cutting disc shaft, is held in place by an interference fit with said shaft, and also acts to rotate said shaft and cutting disc.

18. Apparatus in accordance with claim 17 wherein said guide rollers are fabricated of urethane or rubber and have a durometer #30.

19. A method of dividing a multi-unit battery plate grid including at least two connected individual battery plate grids into separated individual battery plate grids and of subsequently pasting the separated individual battery plate grids, said method comprising the steps of dividing a multi-unit battery plate grid into separated individual battery plate grids, and thereafter pasting the separated individual battery plate grids.

* * * * *